US006438144B1

United States Patent
Guzikevits et al.

(10) Patent No.: US 6,438,144 B1
(45) Date of Patent: Aug. 20, 2002

(54) COMMUNICATION SYSTEM WITH TWO STAGE MULTIPLEXING

(75) Inventors: Zuri Guzikevits, Tel-Aviv; Shalom Bukimer, Holon; Ofer Melman, Yahud, all of (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/266,476

(22) Filed: Mar. 11, 1999

(51) Int. Cl.[7] .................................................. H04J 3/04
(52) U.S. Cl. ........................................ 370/535; 370/498
(58) Field of Search ................................. 370/535, 498, 370/537, 538, 540, 431, 438, 244, 420, 422, 423; 379/219, 220, 229, 240, 269

(56) References Cited

U.S. PATENT DOCUMENTS

| 4,021,619 A | * | 5/1977 | Potter ........................ 370/375 |
| 4,224,475 A | * | 9/1980 | Charransol ................. 370/244 |
| 4,583,218 A | * | 4/1986 | Ardon ........................ 370/376 |
| 4,979,164 A | * | 12/1990 | Ardon ........................ 370/371 |
| 5,757,813 A | * | 5/1998 | Raith ........................ 370/468 |

* cited by examiner

Primary Examiner—Douglas Olms
Assistant Examiner—Ricardo M. Pizarro
(74) Attorney, Agent, or Firm—Fenster & Company Patent Attorneys, Ltd.

(57) ABSTRACT

A communication system comprising:
- a first multiplexing/demutliplexing stage positioned at a first locality and connected to a telephone interchange;
- a plurality of second multiplexing/demultiplexing stage positioned in a plurality of second localities apart from said first locality;
- a communication link, such as a transmission line or radio link which connects said first multiplexing/demultiplexing stage to each of said second multiplexing/demultipleg stages; and
- a plurality of subscribers lines connected to each of a plurality said second multiplexing/demultiplexing stages.

11 Claims, 4 Drawing Sheets

COMMUNICATION SYSTEM WITH TWO STAGE MULTIPLEXING

FIELD OF THE INVENTION

The present invention relates generally to communication systems and specifically to multiplexing access lines of communication systems.

BACKGROUND OF THE INVENTION

Congestion of transmission lines is a well known, and undesirable, situation in communication art. In order to solve congestion problems multiplexing (MUX)/demultiplexing (DEMUX) systems have successfully been incorporated to transmission lines.

FIG. 1A illustrates a block diagram which represent a transmission system 100, of prior art Transmission system 100 comprises two MUX/DEMUX units 102 and 104 and single line 114, preferably an optical fiber, which connects MUX/DEMUX units 102 and 104. Alternatively, line 114 may be a multiconductor line. Umits 102 and 104 are situated at two localities 106 and 108, remote from each other, where a plurality of POTS 110 and 112 are interfaced to units 102 and 104 respectively.

In accordance with the scheme illustrated in FIG. 1A, a plurality of communications from subscribers on lines 116, which enter MUX/DEMUX unit 102, converted to digital signals, multiplexed and routed, through line 114, to locality 108 by unit 102. Unit 104 demultiplexes the signals it receives from line 114, transforms the digital signals into electrical signals and redirects them through lines 118 towards their respective end communication devices (not shown) in locality 108.

The general scheme described above enables transmission system 100 to comprise only one single line connecting localities 106 and 108 and yet handle a plurality of communications.

FIG. 1B illustrates a variation of the prior art illustrated in FIG. 1A. A plurality of communications are routed by a switch board 120, through analog lines 122 to MUX/DEMUX unit 102, then to MUX/DEMUX unit 104 and then to end communication devices 124 in the described above in conjunction with FIG. 1A. Unit 104 is, optionaly power fed by a remote powers supply through lie 114, which in this case may be a multiconductor.

FIG. 1C illustrates a digital loop carrier (DLC) of prior art wherein a switchboard 126 sends a plurality of communication signals over a digital E1 line to a MUX/DEMUX unit 102. MUX/DEMUX unit 102 demultiplexes the plurality of signals it received one or more E1 lines 114 and redirects them towards respective subscribers in much the same way as described above.

The number of communications that can be handled by transmission lines pertaining to prior art described above, depends on the number of communications that each of the components, comprised in the lines, can support. Tie more powerful the components (i.e. components which can multiples/demultiplex greater number of signals) the greater number of communications that can be supported.

Transmission lines of the prior art do not allow their modular expansion. A transmission line of the prior art can be expanded by replacing the MUX/DEMUX components by more powerful MUX/DEMUX components.

SUMMARY OF THE INVENTION

It is an object of some preferred embodiments of the present invention, to provide a communication system (APIC) which has two stage multiplexing/demultiplexing capabilities.

In some preferred embodiments of this invention, a first multiplexing/demultiplexing stage (EU) is situated at, or in the vicinity of, a local exchange in a central office while a second, remote multiplexing/demultiplexing (RU) stage is situated at remote subscribers premises or in their vicinity. Preferably, a plurality of EU modules are comprised in a shelf so as to form a serial bus.

In some preferred embodiments of the present invention, a plurality of RU modules are interfaced to a single EU module. Preferably, an RU module supports 2 POTS (RU2 nodule). Alternatively, an RU module may support 10 POTS (RU10 module) or some number of POTS or other analog lines. Additionally, a single EU module may support RU2 and RU10 modules jointly. Alternatively, RU modules may support digital communication lines. Additionally, the RU modules may support POTS and digital communication lines jointly. Alternatively and/or additionally, RU modules generate preferably all necessary subscriber signals including current feed, ring, and/or metering.

In one aspect of the invention, the EU module comprised in some of preferred embodiments of the present invention, supports CAS protocols Additionally, the EU module may support newer CCS communication protocols like V5 communication protocol and/or ISDN-PRI protocol which enables these preferred embodiments to be connected to legacy and/or newer local exchanges. Additionally and preferably, the EU module comprises a power supply unit to remotely power the RU modules as well as the EU itself More preferably, the power supply unit comprised in the EU module comprises necessary protection and safety circuitry.

In one aspect of the invention, the APIC communication system does not require preliminary setup. Additionally, the APIC system. is preferably able to function independent of a central clock source. Preferably, the APIC communication system also allows for communication between any of the subscribers it serves, without connection to a central office.

There is thus provided, in accordance with a preferred embodiment of the invention, a communication system comprising:

a first multiplexing/demultiplexing stage positioned at a first locality and connected to a telephone interchange;

a plurality of second multiplexing/demunltiplexing stage positioned in a plurality of second localities apart from said first locality;

a communication channel such as a transmission line or a radio link which connects said first multiplexing/demultiplexing stage to each of said second multiplexing/demultiplexing stages; and a plurality of subscribers lines connected to each of a plurality said second multiplexing/demultiplexing stages.

Preferably, the first stage is interfaced with said telephone exchange with a single digital interface.

Preferably, the digital interface comprises a plurality of logical lines wherein the total number of subscriber lines connected to said second multiplexing/demultiplexing stages is greater than said plurality of logical lines.

In a preferred embodiment of the invention, the subscribers include subscribers connected to said second stage by POTS lines. Alternatively or additionally the subscribers include subscribers connected to said second stage by ISDN lines.

There is further provided, in accordance with a preferred embodiment of the invention, communication apparatus, comprising:

a plurality of communication systems according to the invention;

a bus connecting said communications systems;

a control unit that mediates communication between said communication systems.

preferably, the switchboard connects a subscriber served by one of said second stages with a subscriber served by another of said second stages.

Preferably the communication apparatus includes means for grooming the switchboard.

There is further provided, in accordance with a preferred embodiment of the invention, a communication method comprising.

connecting a first multiplexing/demultiplexig stage to a telephone interchange;

connecting a plurality of second multiplexing/ demultiplexing stage positioned in a plurality of second localities to each of said first multiplexing/demultiplexing stages;

connecting a plurality of subscribers to each of said second multiplexing/demultiplexing stages;

There is further provided, in accordance with a preferred embodiment of the invention, a communication method comprising:

connecting a plurality of first multiplexing/ demultiplexing stages to a telephone interchange;

connecting a plurality of second multiplexing/ demultiplexing stages positioned in a second locality to each of said first multiplexing/demultiplexing stage; and connecting a plurality of subscribers to said second multiplexing/demultiplexing stage;

connecting said first stages via a bus; and mediating between said first stages via said bus.

In a preferred embodiment of the invention, connecting said first stage comprises connecting said first stage to said telephone exchange with a single digital interface.

Preferably, the communication method comprises connecting a subscriber served by one of said second stages with a subscriber served by another of said second stages via said bus.

In a preferred embodiment of the invention, the subscribers include subscribers connected to said second stage by POTS lines. Alternatively or additionally,the subscribers include subscribers connected to said second stage by ISDN lines.

BRIEF DESCRIPTION OF FIGURES

The invention will be more clearly understood by reference to the following description of preferred embodiments thereof, read in conjunction with the accompanying figures. Identical structures, elements or parts that appear in more than one of the figures are labeled with the same numeral in all the figures in which they appear.

DETAILED DESCRIPTION OF PREFERRED EMBODIMENTS

Figure 2:
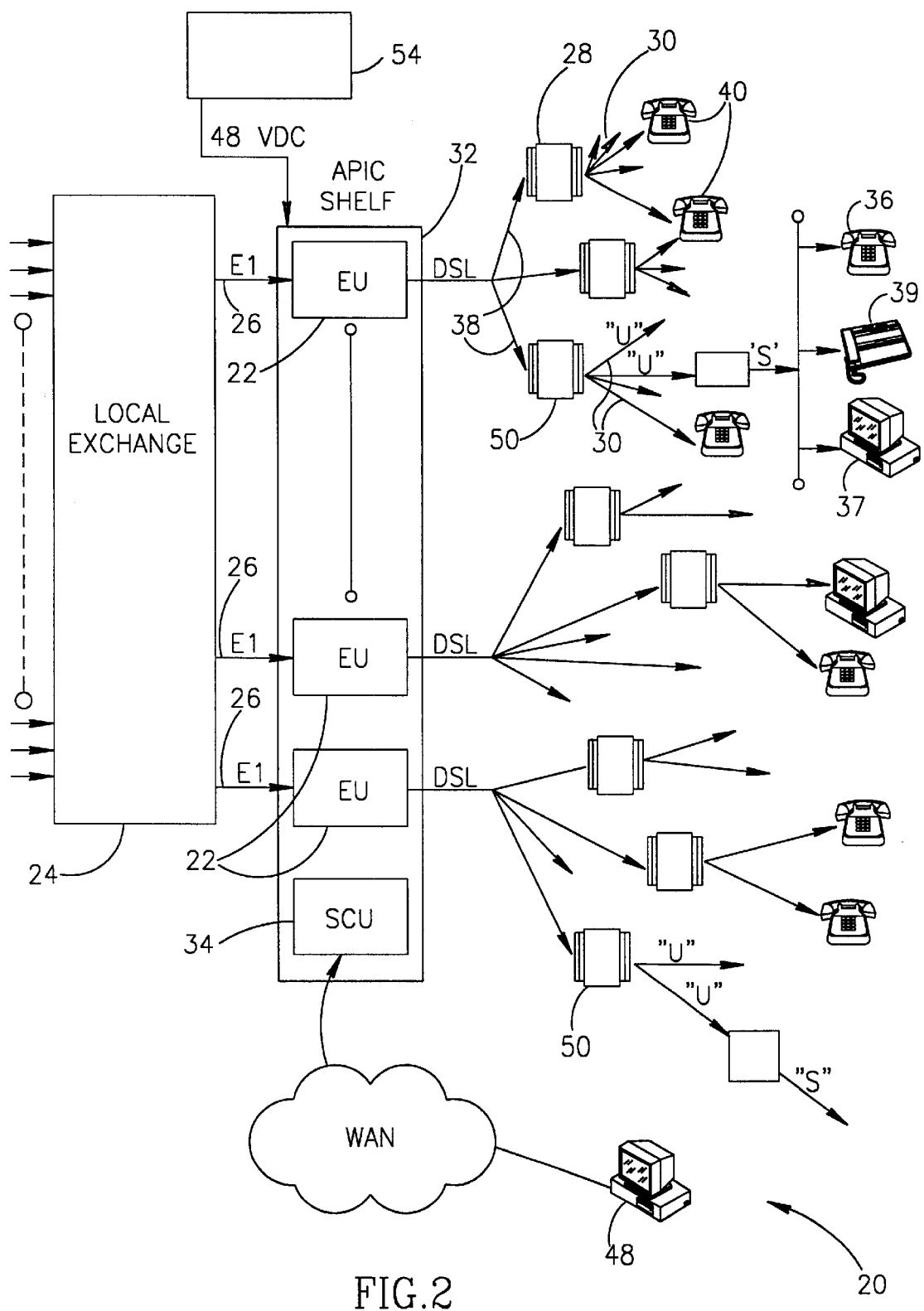
FIG. 2 shows schematically a fully populated APIC transmission system in accordance with a preferred embodiment of the present invention.
Figure 3:
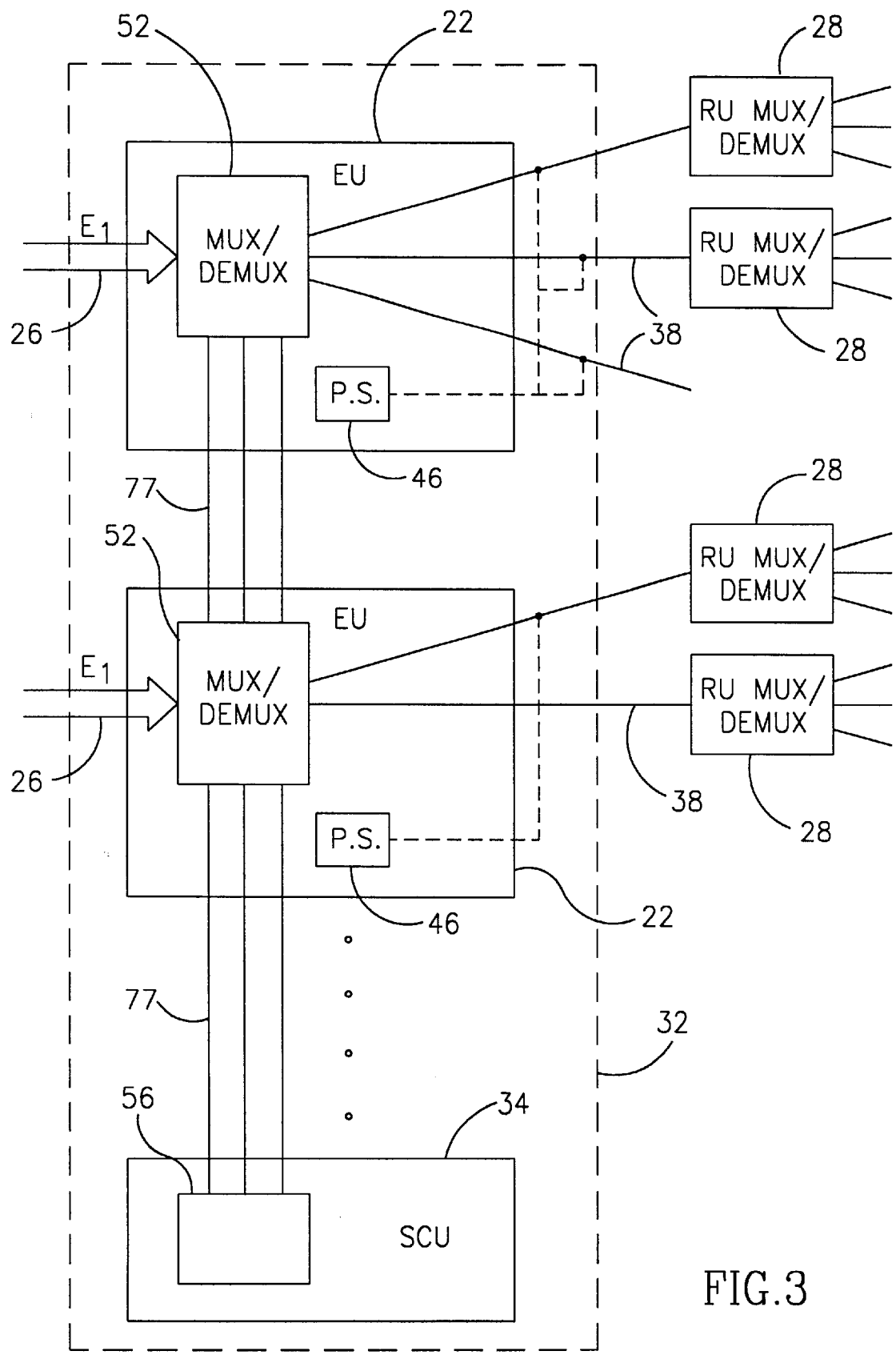
FIG. 3 shows schematically details of a cabinet comprising exchange modules of an APIC transmission system, in accordance with a preferred embodiment of the present invention.

Reference is now made to both FIG. 2 which shows schematically a fully populated APIC transmission system 20 and to FIG. 3 which shows some details of a cabinet (i.e., numeral 32 in FIG. 2) comprising exchange modules (EU), in accordance with a preferred embodiment of the present invention.

APIC 20, preferably supports simultaneously basic rate ISDN and analog telephone lines. APIC 20 comprises at least one exchange unit (EU) 22, which preferably supports CAS and newer CCS communication protocols like V5 communication protocol and/or ISDN-PRI protocol, interfaced to a local exchange 24, through digital exchange interface (E1) 26, and a plurality of remote units (RU) 28. The operation of EU 22 performs roost of its functions via a MUX/DEMUX unit 52, shown on FIG. 3 and described in more detail below, with respect to FIG. 4. In some preferred embodiments of the present invention, APIC 20, preferably uses 64 Kbps rate PCM standard for digital voice transmission between analog communication devices 40 and exchange interface 26.

Preferably, each RU 28 is interfaced with a single EU module 22 by a communication line 38 such as an HSDL twisted pair. Alternatively, communication line 38 may be of ISDN type. Alternatively, communication line 38 may be of any other multi subscriber twisted pair or may be an optical transmission line. In some preferred embodiments of the present invention, each EU module 22, may support HSDL, ISDN and other multi subscriber lines jointly. Communication line(s) 38 preferably enable(s) full duplex 784 bits connection between RU 28, and EU 22, modules, preferably, over existing infrastructure by combining voice channels which preferably use high rate digital 2B1Q technique.

In some preferred embodiments of the present invention, each RU module may be either a POTS type 28, or an ISDN type 50. A POTS type RU module preferably supports a plurality of analog telephones 40 (or other analog devices such as facsimile machines or modems), while an ISDN type RU module preferably supports a plurality of digital communication devices such as telephones 36, PCs 37 and/or FAXs 39. Alternatively, some RU modules may support a plurality of both analog and digital communication devices. RU module 28 preferably handles all necessary conversations to and from subscriber lines 30. Each RU module 28, may support a number of POTS and/or digital communication devices.

RU modules 28 and 50 may be installed in street cabinets. Alternatively, RU modules 28 and/or 50 may be wall mounted in any protected indoor location. Altenatively, RU modules 28 may be wall or pole mounted in an unprotected outdoor locality. Alteinatively, RU modules 28 and/or 50 way be installed underground. Preferably, RU modules are remotely powered via line 38, as in some prior art embodiments, and preferably generates all necessary subscriber power and signals including current feed, ring, and/or metering.

EU module 22, which preferably is a stand alone module, is plugged in an EU shelf 32 which preferably is an ETSI 19 inch compliant standard shelf In some preferred embodiments of the present invention, a fully populated EU shelf 32 consists of sixteen EU modules 22 and a shelf control unit (SCU) 34. SCU 34, which provides management interface between the shelf 32 and Shelf/Site OPS, controls and interfaces preferably up to sixteen EU modules 22. EU and SCU modules are mounted on a bus 58 which is connected to a switchboard 56 in SCU 34.

SCU module 34, enables maintenance and management, preferably, via graphical user interface, preferably, on an MS windows platform. Altenatively, a higher hierarchy, preferably UNIX based network management and control unit 48 (see FIG. 2) is supported by SCU module 34. SCU 34 handles concentration and grooming, if necessary of user interfaces towards the network (E1) interfaces. It can perform these functions by running proprietary or standard protocols, such as V5.2 and using on board switchboard 56. Two SCUs can be installed for redundancy and increased capacity. In some embodiments of the present invention, a UNIX based network management system (NMS) 48 (see FIG. 2) may control a plurality of APICs 20 through their individual SCU modules. Alternatively, APICs 20 can operate without shelf control unit 34, if management and interface of EU modules 22, is not required.

Figure 1A:
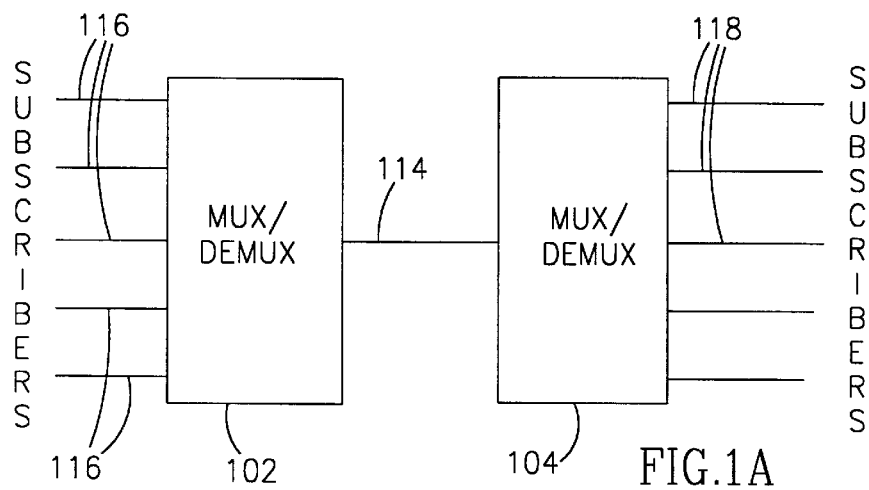
FIGS. 1A–1C show prior art communication systems.
Figure 1B:
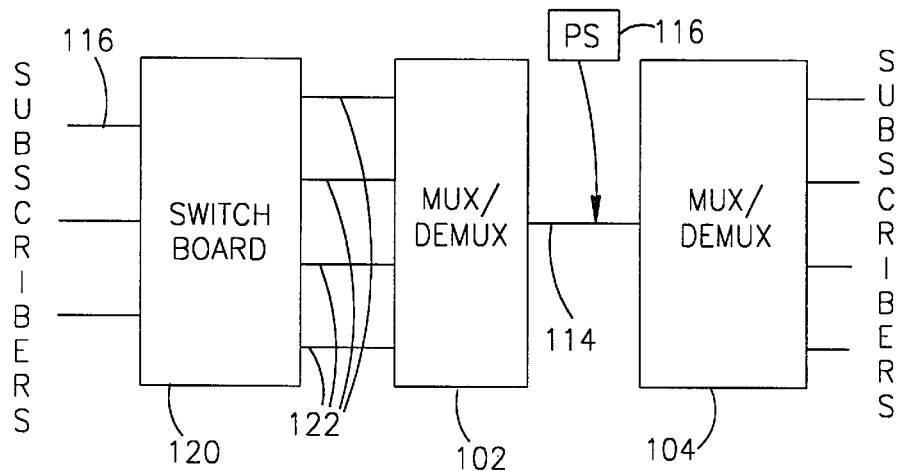
Figure 1C:
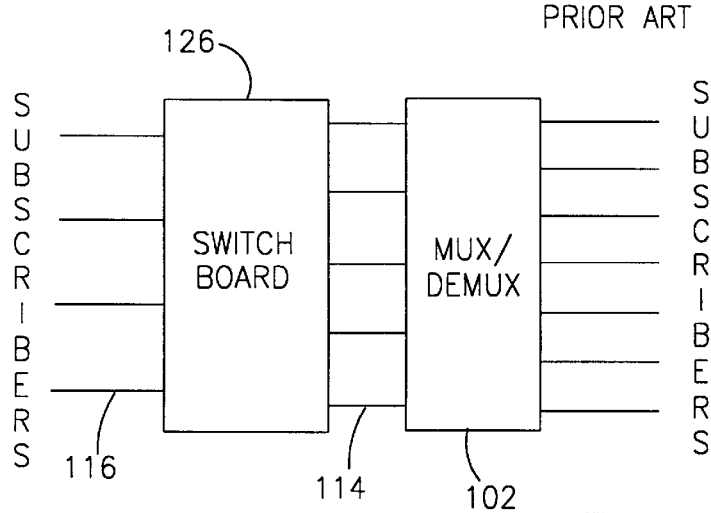
Figure 4:
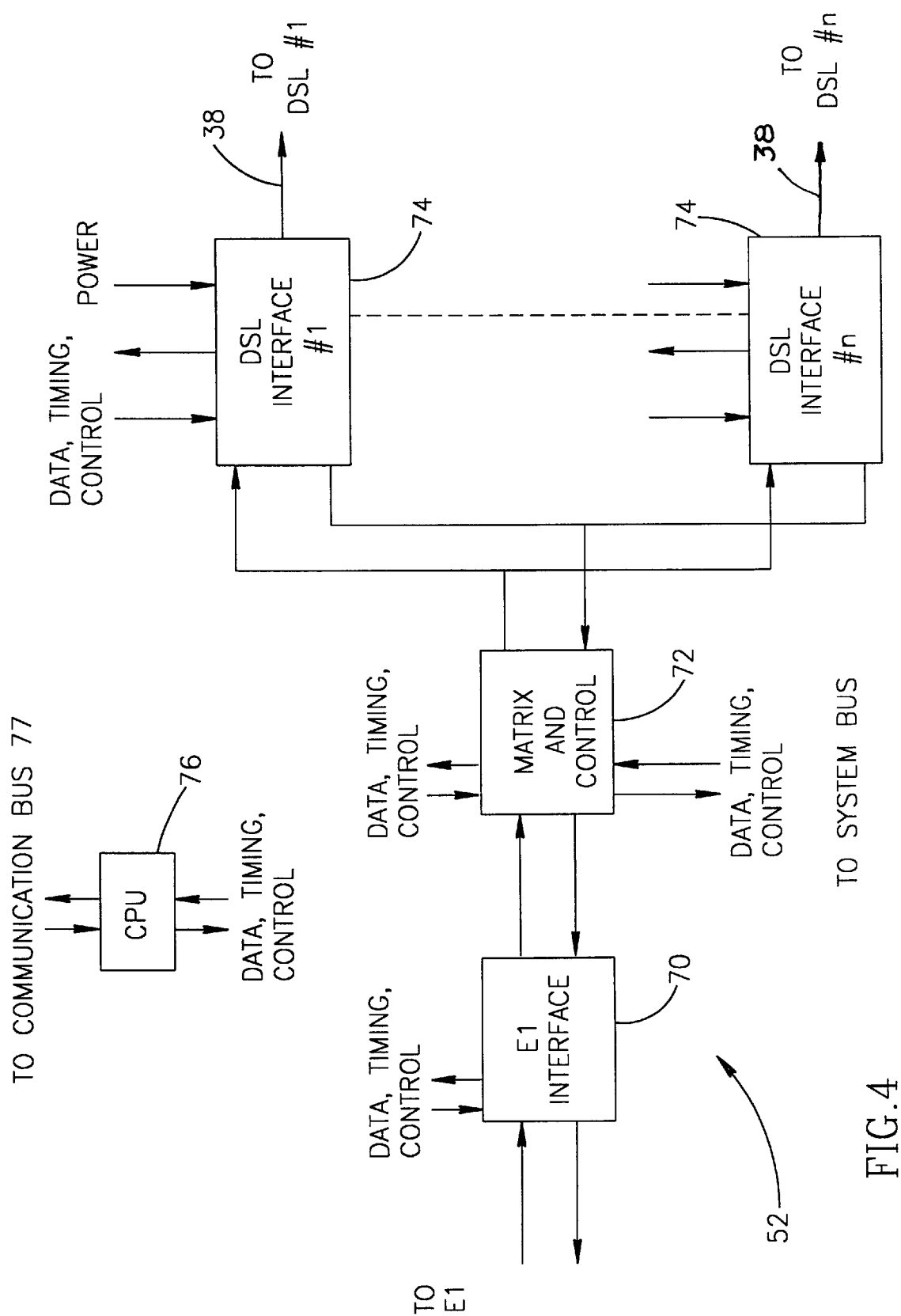
FIG. 4 is a schematic block diagram of a MUX/DEMUX unit in accordance with a preferred embodiment of the invention.

FIG. 4 shows a preferred embodiment of MUX/DEMUX unit 52 in greater detail, but still in schematic form. In general MUX/DEMUX unit 52 comprises an E1 interface 70 a matrix and control unit 72 and a plurality of digital subscriber line (DSL) interfaces 74. E1 interface 70 acts as the interface to local exchange 24 and DSL interfaces 72 each connect to a digital subscriber line 38 which connects the DSL interface with an RU. Matrix and control unit 72 is a switchboard and control system that switches the lines from interfaces 74 (and the outside subscribers) to interface 70 (and the local exchange). In addition, unit 72 can also transfer data from either interface 70 or 74 to other EUs or to SCU 34 via a system bus, based on the destination of the data Matrix and control unit 72 also receives and sends timing and control signals to and from the system bus. In a preferred embodiment of the invention, MUX/DEMUX unit 52 also contains a local CPU 76 that preferably provides local control of the DSL interfaces, the E1 interface and the matrix and control unit, preferably via a local BUS (not shown). In a stand alone mode it preferably provides full control of the EU. When the EU is integrated into a system as in FIGS. 1–3, the CPU operates under at least partial control of the SCU, via a communication bus 77.

It should be understood that the present invention is useful with a large number of different interfaces and remote units. In some preferred embodiments of the invention, the number of subscribers is the same or fewer than the number of logical connections (E1) to the local exchange. However, in accordance with a preferred embodiment of the invention, for SCU 34 to provide management of the connections such that the number of subscribers exceeds the number of logical connections to the local exchange.

The EU units 22 each preferably include a power supply 46 wich preferably contains all protection and safety circuitry. Power supply units are used to power the EUs, and preferably are utilized to remotely power RUs connected to the EU as well.

Shelf control unit (SCU) 34, serves as a mediation device between EU modules 22 and management and control unit 48. SCU 34 has, preferably, RS232/4,5 interfaces (not shown) which enables control, configuration and maintenance of BU modules 22. Preferably, control, configuration and maintenance of EU modules 22, is performed from a remote locality where management and control unit 48, is positioned. Altenatively, control, configuration and maintenance of EU modules 22, is performed directly from SCU module 34 without using management and control unit 48. In some preferred embodiments of the present invention, control, configuration and maintenance of EU modules 22, may be performed both directly from SCU module 34 and/or management and control unit 48.

The slots of EU shelf 32, can also be occupied, by other data communication products such as the HiWAY™ high speed Internet access product or the ExLine2™, in order to extend E1 services from local exchange 24 to customer premises, of ECI Israel. EU shelf 32 is preferably installed at the local exchange premises. Alternatively, EU shelf 32 may be installed in a street cabinet, preferably in the vicinity of a local exchange 24.

In some preferred embodiments of the present invention, a central connection panel (CCP) 54, is installed, preferably, above EU shelf 32 CC 54, enables connecting to shelf 32, preferably protected–48 VDC power supply output, G.703 unbalanced (75 Ω) or balanced (120 Ω), G703/10 external clock input and output, alarm and/or management interfaces and DSL lines interfaces.

By implementing a two stage multiplexing/demultiplexing configuration that includes plug-in EU modules 22, at exchange 24, premises and separate remote subscriber units 28, (multi point configuration) at the subscriber end, some preferred embodiments of the present invention enable flexible planning, installation, operation and/or Maintenance of the APIC transmission system 20. In some preferred embodiments of the present invention, and due to its flexibility, new services may be introduced to the APJC 20 transmissiom system as they appear.

In some preferred embodiments of the present invention, APIC transmission system 20 has no"single point of failure" in the sense that failure of one of the EUs will affect only the subscribers connected to it while the rest of the transmission system continues to operate. Additionally and/or alternatively, the subscribers connected to different RUs can communicate with each other via bus 58, through the mediation of switchboard 55, without going through local exchange 24.

In some preferred embodiments of the present invention, APIC transmission system 20 does not require any preliminary setup. Preferably, APIC 20 is fully operational by its default settings. More preferably, APIC 20 is able to function independent of a central clock source. Preferably, APIC 20 extracts its internal timing signals from its own E1 connection.

While the invention has been described with reference to certain preferred embodiments, various modifications will be readily apparent t, and may be readily accomplished by persons skilled in the art without departing from the spirit and the scope of the above teachings. Therefore, it is understood that the invention may be practiced other than as specifically described herein without departing from the scope of the following claims:

It will be appreciated by a person skilled in the art that the present invention is not limited by what has thus far been described Rather, the present invention is limited only by the Preferably, the communication method comprises connecting a subscriber served by one of said second stages with a subscriber served by another of said second stages via said bus. claims which follow. when used in the following claims, the terms"comprises","comprising", "includes", "including" or the like means "including but not limited to".

What is claimed is:

1. Communication apparatus, comprising:
    a plurality of communication systems each comprising:
    a first multiplexing/demultiplexing stage positioned at a first locality and connected to a telephone interchange;
    a plurality of second multiplexing/demultiplexing stages positioned in a plurality of second localities apart from said first locality;
    a communication link which connects said first multiplexing/demultiplexing stage to each of said second multiplexing/demultiplexing stages;

a plurality of subscriber lines connected to each of a plurality of said second multiplexing/demultiplexing stages;

a bus connecting said communications systems; and a control unit that mediates communication between said communication systems.

2. Communication apparatus according to claim 1 wherein at least one said first stage is interfaced with its respective telephone exchange with a single digital interface.

3. Communication apparatus according to claim 2 wherein the digital interface comprises a plurality of logical lines wherein a total number of subscriber lines connected to said second multiplexing/demultiplexing stages is greater than said plurality of logical lines.

4. A communication system according to claim 1 wherein at least one of said first multiplexing/demultiplexing stages is connected with said telephone exchange via digital interfaces comprising a plurality of logical lines.

5. A communication system according to claim 4 wherein the total number of subscriber lines connected to at least one of said second multiplexing stages is greater than said plurality of logical lines.

6. Communication apparatus according to any of claims 2, 3, 1, 4 or 5 wherein the subscribers include subscribers connected to said second stage by POTS lines.

7. Communication apparatus according to any of claims 2, 3, 1, 4 or 5 wherein the subscribers include subscribers connected to said second stage by ISDN lines.

8. Communication apparatus according to any of claims 2, 3, 1, 4 or 5 and including:

a switchboard in said control unit connected to said bus;

a computer that controls communication between said communications systems via said switchboard.

9. Communication apparatus according to claim 8 wherein said switchboard connects a subscriber served by one of said second stages with a subscriber served by another of said second stages.

10. A communication system according to claim 8 and including means for grooming the switchboard.

11. A communication system according to claim 9 and including means for grooming the switchboard.

* * * * *